UNITED STATES PATENT OFFICE.

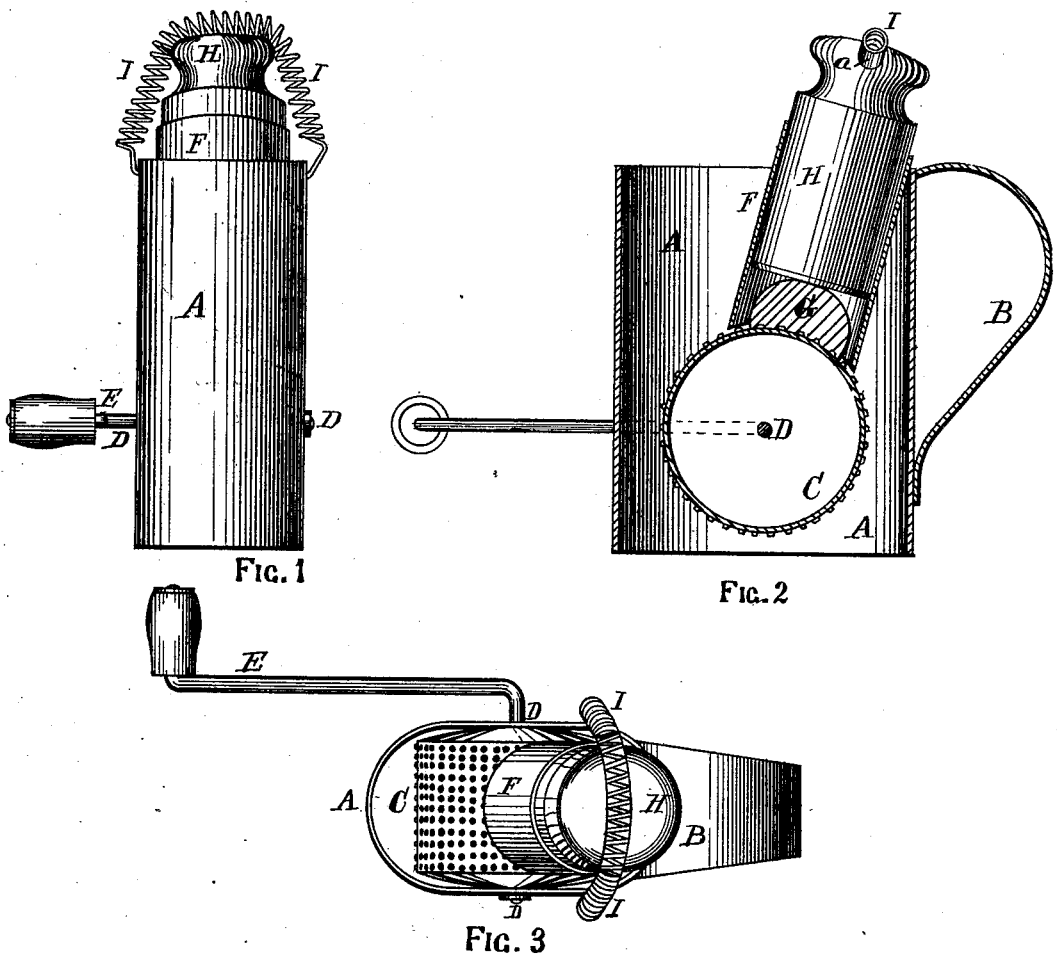

JAMES R. HUGHES, OF SAUGUS, MASSACHUSETTS.

IMPROVEMENT IN NUTMEG-GRATERS.

Specification forming part of Letters Patent No. 187,861, dated February 27, 1877; application filed January 29, 1877.

*To all whom it may concern:*

Be it known that I, JAMES R. HUGHES, of Saugus, in the county of Essex and State of Massachusetts, have invented certain new and useful Improvements in Nutmeg-Graters, of which the following, taken in connection with the accompanying drawings, is a specification:

My invention relates to the arrangement of the parts constituting the improved grater, whereby it is rendered more convenient of operation; and it consists in the combination of a rotating cylinder, provided with a grating-surface, a tubular holder for the article to be grated, a follower, and a spring attached by its ends to opposite sides of the inclosing casing or tubular holder, and passing over the top of the follower in the form of a loop, and adapted to force the follower and the article being grated along the tubular holder toward the grating-cylinder as fast as the article is grated away, and to be readily and easily removed from the top of the follower without disconnecting it at either end from its attachment to the casing or tubular holder, as will be further described.

My invention further consists in the combination of a revolving cylinder, provided with a suitable grating-surface, an inclosing case, within which said cylinder revolves, and provided with a handle, by which the implement is held while being operated, a tubular holder located within said casing, and having its top end inclined toward the handle of the casing to bring it into convenient proximity to the thumb of the left hand when holding the implement, and a follower fitted to said tubular holder, and adapted to be pressed downward thereon by a spring, or by the thumb of the operator.

Figure 1 is a front elevation of my improved nutmeg-grater. Fig. 2 is a central vertical section, and Fig. 3 is a plan.

A is the casing, made of tin, and oval in shape, as seen in plan, and provided with the handle B, by which the implement is held while in operation. C is the grating-cylinder, also made of tin, and mounted on the wire shaft D, having bearings in the side walls of the casing A, and bent at right angles to form the crank E, by which said cylinder may be rotated. The cylinder C is so located in the casing A that its lower side is above the lower open end of the casing, so that when not in use the grater may be set on the table or a shelf, resting upon the lower end of the casing A, in an obvious manner. F is a metal tube, secured to the casing A near its upper end, in an inclined position, with its lower end in close proximity to the grating-cylinder, and cut to a curve parallel to the periphery of the cylinder, as shown in Fig. 2. G is a partially-used nutmeg, placed in the tube F and resting on the roughened surface of the cylinder C, and H is the follower placed within the tube F and resting on the nutmeg. I is a spiral spring, attached by both its ends to the casing A, or upon opposite sides of the tube F, and extending over the top of the follower H in the form of a loop, being held in place thereon by resting in the groove $a$, formed in and extending across the top of said follower. Instead of the spiral spring, an elastic cord or strip of rubber may be used. A great advantage is obtained by the use of the loop-spring I, in that it is readily and easily removed from the end of the follower H without disconnecting it from its attachment to the casing or the tubular holder, for the purpose of facilitating the insertion of the nutmeg within the tubular holder, and in case the operator desires to grate the nutmeg very fine she can do so by removing the bite of the spring from the follower and pressing lightly on the top of the follower with her thumb.

The operation of my improved grater is as follows: The nutmeg is placed in the tube F, and the follower H is inserted in said tube, and the loop of the spring I is placed in position in the groove $a$. The grater is then taken in the left hand by the handle B, and the cylinder C is revolved by the crank E, in an obvious manner.

What I claim as new, and desire to secure by Letters Patent of the United States, is—

1. The combination of the revolving grating-cylinder C, the tubular holder F, the follower H, and the looped spring I, secured by both its ends to the casing A or the tube F, all arranged and adapted to operate substantially as and for the purpose specified.

2. The combination of the revolving cylinder C, provided with a grating-surface, the open-ended tubular casing provided with the handle B, the tubular holder F, secured within said casing, with its top end inclined toward the handle B, and the follower H, all arranged and adapted to operate as and for the purposes described.

Executed at Boston, Massachusetts, this 25th day of January, A. D. 1877.

JAMES R. HUGHES.

Witnesses:
 N. C. LOMBARD,
 E. A. HEMMENWAY.